(12) United States Patent
Sun et al.

(10) Patent No.: US 11,836,293 B2
(45) Date of Patent: Dec. 5, 2023

(54) METHOD AND AN ELECTRONIC DEVICE FOR 3D GESTURE INTERACTION ACROSS NEARBY ELECTRONIC DEVICES

(71) Applicant: MediaTek Singapore Pte. Ltd., Singapore (SG)

(72) Inventors: Guangyu Sun, Beijing (CN); Ning Li, Beijing (CN); Youxiu Wang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 17/587,044

(22) Filed: Jan. 28, 2022

(65) Prior Publication Data
US 2023/0214023 A1    Jul. 6, 2023

(30) Foreign Application Priority Data
Jan. 6, 2022    (CN) .......................... 202210010943.7

(51) Int. Cl.
*G06F 3/01*     (2006.01)
*G06F 3/0486*   (2013.01)

(52) U.S. Cl.
CPC ............ *G06F 3/017* (2013.01); *G06F 3/0486* (2013.01)

(58) Field of Classification Search
CPC .............................. G06F 3/017; G06F 3/0486
See application file for complete search history.

(56) References Cited

U.S. PATENT DOCUMENTS

| 10,860,117 B2 | 12/2020 | Cho et al. |
| 2020/0192486 A1 | 6/2020 | Schoessler et al. |
| 2022/0137204 A1* | 5/2022 | Nguyen ................ G01S 13/765 342/28 |
| 2022/0300079 A1* | 9/2022 | Jakes ...................... H04W 4/80 |

FOREIGN PATENT DOCUMENTS

| TW | 200919210 A | 5/2009 |
| TW | 201818293 A | 5/2018 |

OTHER PUBLICATIONS

Chinese language office action dated Jan. 19, 2023, issued in application No. TW 111104650.

\* cited by examiner

*Primary Examiner* — Grant Sitta
(74) *Attorney, Agent, or Firm* — McClure, Qualey & Rodack, LLP (57) ABSTRACT

A method for 3D gesture interaction across electronic devices includes: measuring spatial location information of the electronic devices based on Location Technology; generating a 3D gesture field of the electronic devices based on the spatial location information; setting the location update method, the detection method of 3D gesture, the frequency band of detecting 3D gesture, and the time sequence of detecting gesture at different devices; detecting the cooperative gesture; generating interactive auxiliary messages based on the detection of the cooperative gesture; updating the 3D gesture field if the location of any devices have update; identifying the cooperative gesture in the 3D gesture field of the electronic devices; performing the commands corresponding to the cooperative gesture; detecting that the cooperative gesture is beyond the 3D gesture field of the electronic devices; and sending the cooperative gesture to other electronic devices based on the direction of the cooperative gesture.

35 Claims, 9 Drawing Sheets

METHOD AND AN ELECTRONIC DEVICE FOR 3D GESTURE INTERACTION ACROSS NEARBY ELECTRONIC DEVICES

CROSS REFERENCE TO RELATED APPLICATIONS

This application claims priority of and the benefit of China Application No. 202210010943.7, filed on Jan. 6, 2022, the entirety of which is incorporated by reference herein.

FIELD OF THE DISCLOSURE

The present invention is related to 3D gesture applications, and in particular it is related to a method and an electronic device for 3D gesture interaction across nearby electronic devices.

DESCRIPTION OF THE RELATED ART

The Ultra-wideband (UWB) chip provides spatial awareness, so that the terminal can accurately measure the distance and direction from the surrounding UWB devices. For example, the distance accuracy of the UWB chip may be +/−10 cm, and the direction accuracy of the UWB chip may be +/−3 degrees. The ultrasound 3D gesture interaction field is a three-dimensional space that exceeds the size of the electronic device, and the ultrasound 3D gesture interaction field has 180 degrees surround view, millimeter-level detection accuracy, capability of measuring the distance of multiple targets at the same time. Furthermore, air gestures (for example, swipe, tag, etc.) are allowed in the front, above, below or on the side of the electronic device in ultrasound 3D gesture interaction field.

At present, 3D gesture interaction is mostly simulating 2D touch operation, which is limited to interaction within a single device or a single application (APP). The Artificial Intelligence of Things (AIOT) depicts a blueprint for device interconnection. At present, the collaborative operation of multiple devices still uses 2D touch interaction as a mainstay. It is still rare to realize the collaborative operation of multiple devices based on 3D gestures.

BRIEF SUMMARY OF THE DISCLOSURE

In order to resolve the issue described above, the present invention provides a method for 3D gesture interaction across a plurality of electronic devices. The method is performed by one of the electronic devices. The method includes measuring spatial location information of the electronic devices based on location technology; generating a 3D gesture field of the electronic devices based on the spatial location information of the electronic devices; setting the location update method, the detection method of 3D gesture, the frequency band of detecting 3D gesture, and the time sequence of detecting gesture at different devices; detecting or receiving the cooperative gesture; generating interactive auxiliary messages based on the detection of the cooperative gesture; Updating the 3D gesture field of the electronic devices if the location of any devices have update; identifying the cooperative gesture in the 3D gesture field of the electronic devices; performing the commands corresponding to the cooperative gesture; detecting that the cooperative gesture is beyond the 3D gesture field of the one electronic device; and sending the cooperative gesture to other electronic devices based on the direction of the cooperative gesture.

According to the method above, the Location Technology is Ultra-wideband (UWB) technology.

According to the method above, the step of generating the 3D gesture field of the electronic devices based on the spatial location information of the electronic devices, includes mapping the other electronic devices to the side of the 3D gesture field of the one electronic device. The step of identifying the cooperative gesture in the 3D gesture field includes: identifying a pick-up gesture; identifying a drag gesture; and identifying a drop gesture.

According to the method above, the step of mapping the other electronic devices to the side of the 3D gesture field of the one electronic device includes: calculating the direction from the one electronic device to the other electronic devices; and mapping the other electronic devices to the side of the 3D gesture field of the one electronic device based on the direction from the one electronic device to the other electronic devices.

According to the method above, the step of identifying the pick-up gesture, includes selecting an object that a user wants to share by the pick-up gesture via the 3D gesture field applied by Ultrasound. The step of identifying the drag gesture includes: showing up pop-up user interfaces of the other electronic devices according to the direction from the one electronic device to the other electronic devices; and getting a target electronic device among the other electronic devices via the direction of the drag gesture.

According to the method above, the target electronic device is gotten when an angle β approaches zero. The angle β is the angle between a vector $\overrightarrow{OB'}$ and a vector $\vec{a}$. The vector $\overrightarrow{OB'}$ is the direction from the center of the one of the electronic device to the side of the 3D gesture field of the one electronic device, and the side of the 3D gesture field is mapped by the other electronic devices. The vector $\vec{a}$ is the direction from the center of the one electronic device to the current location of the drag gesture.

According to the method above, the step of identifying the drop gesture includes sending the object which is selected by the pick-up gesture in the 3D gesture field of the one electronic device to the target electronic device via the direction of the drag gesture and the location of the drop gesture.

According to the method above, the step of generating the 3D gesture field of the electronic devices based on the spatial location information of the electronic devices includes creating a combined gesture field for the one electronic device and the electronic device nearby the one electronic device via the Location Technology.

According to the method above, the step of creating a combined gesture field for the one electronic device and the electronic device nearby the one electronic device includes combining the 3D gesture field of the one electronic device and that of the electronic device nearby the one electronic device via the locations of the one electronic device and the electronic device nearby the one electronic device and the direction from the one electronic device to the electronic device nearby the one electronic device.

According to the method above, the step of identifying the pick-up gesture includes selecting an object at the one electronic device by the pick-up gesture.

According to the method above, the step of identifying the drag gesture includes sending the drag gesture to the electronic device nearby the one electronic device if the drag gesture is beyond the side of the 3D gesture field of the one electronic device; and showing a drag-gesture user interface at the electronic device nearby the one electronic device.

According to the method above, the step of identifying the drop gesture includes sending the object selected by the pick-up gesture to the electronic device nearby the one electronic device.

According to the method above, the step of generating the 3D gesture field of the electronic devices based on the spatial location information of the electronic devices includes creating a dynamic combined gesture field for the one electronic device and multiple moving electronic devices in the electronic devices via the Location Technology.

According to the method above, the step of creating the dynamic combined gesture field for the one electronic device and the multiple moving electronic devices in the electronic devices via the Location Technology includes combining the 3D gesture field of the one electronic device and those of the moving electronic devices according to the real-time locations and the directions of the one electronic device and the moving electronic devices in indoor coordinates.

According to the method above, the step of identifying the pick-up gesture includes getting the direction of the pick-up gesture of one of the moving electronic devices; getting the ID of the other moving electronic device by comparing the direction of the pick-up gesture with the direction from the one moving electronic device to the other moving electronic device; and showing an authorization user interface at the other moving electronic device, and waiting for the other moving electronic device to agree to the connection.

According to the method above, the step of identifying the drag gesture includes sending the drag gesture to the one electronic device if the direction from the other moving electronic device to the one electronic device interacts with the 3D gesture field of the one electronic device; and showing a drag-gesture user interface at the one electronic device if the drag gesture enters the 3D gesture field of the one electronic device.

According to the method above, the step of identifying the drop gesture includes: showing and controlling the user interface of the other one moving electronic devices at the one electronic device.

According to the method above, the step of generating the 3D gesture field of the electronic devices based on the spatial location information of the electronic devices includes: creating a combined gesture field for the one electronic device, the other electronic device, and a moving electronic device in the electronic devices via the Location Technology.

According to the method above, the step of creating the combined gesture field for the one electronic device, the other electronic device, and the moving electronic device in the electronic devices via the Location Technology includes combining the 3D gesture field of the moving electronic device with those of the one and the other electronic device according to the locations and the directions of the moving electronic device and the one and the other electronic device in the coordinates of the moving electronic device when the moving electronic device and the one and the other electronic device are face to face.

According to the method above, the step of identifying the pick-up gesture includes getting the direction from the moving electronic device to the other electronic device in the coordinates of the moving electronic device; calculating the direction from a hand in the pick-up gesture to the other electronic device and the direction from the moving electronic device to the hand in the pick-up gesture in the coordinates of the moving electronic device; and getting the ID of the other electronic device by comparing the direction from the moving electronic device to the other electronic device, the direction from the hand in the pick-up gesture to the other electronic device, and the direction from the moving electronic device to the hand in the pick-up gesture.

According to the method above, the ID of the other electronic device is gotten when the result of a vector $\vec{a}$ plus a vector $\vec{b}$ intersect with a vector $\vec{c}$. The vector $\vec{a}$ is the direction from the moving electronic device to the hand in the pick-up gesture. The vector $\vec{b}$ is the direction from the hand in the pick-up gesture to the other electronic device. The vector $\vec{c}$ is the direction from the moving electronic device to the other electronic device.

According to the method above, the step of identifying the drag gesture includes getting the direction of the drag gesture in the coordinates of the moving electronic device; getting the direction from the moving electronic device to the one electronic device in the coordinates of the moving electronic device; sending the drag gesture and the ID of the other electronic device to the one electronic device if the drag gesture enters the 3D gesture field of the one electronic device; and showing a drag-gesture user interface at the one electronic device if the direction of the drag gesture and the direction from the moving electronic device to the one electronic device intersect in the 3D gesture field of the one electronic device.

According to the method above, the step of identifying the drop gesture includes showing and controlling the user interface of the other electronic device at the one electronic device.

According to the method above, the step of generating the 3D gesture field of the electronic devices based on the spatial location information of the electronic devices includes mapping applications of the one electronic device to the 3D gesture field of a moving electronic device.

According to the method above, the step of mapping applications of the one electronic device to the 3D gesture field of a moving electronic device includes mapping the shortcut of a first application at the one electronic device to the 3D gesture field of the moving electronic device when the one electronic device and the moving electronic device are face to face; and combining the 3D gesture field of the moving electronic device with that of the one electronic device according to the real-time locations and the directions of the one electronic device and the moving electronic device.

According to the method above, the step of identifying the pick-up gesture includes showing a second application at the one electronic device, and showing the shortcut of the first application at the moving electronic device; getting the scope of the pick-up gesture by the moving electronic device, and mapping the scope to the one of the electronic device; and selecting an object from the second application at the one electronic device by the scope of the pick-up gesture.

According to the method above, the step of identifying the drag gesture includes showing a drag-gesture user interface at the one electronic device and the moving electronic device.

According to the method above, the step of identifying the drop gesture includes sending the object by touching the shortcut of the first application via the drop gesture based on the moving electronic device.

According to the method above, the step of generating the 3D gesture field of the electronic devices based on the spatial location information of the electronic devices includes mapping application shortcuts to the side of the one electronic device.

According to the method above, the step of mapping the application shortcuts to the side of the one electronic device includes mapping the shortcut of a first application to the side of the 3D gesture field of the one electronic device. Different positions at the side of the 3D gesture field of the one electronic device correspond to different shortcuts of the first application.

According to the method above, the step of identifying the pick-up gesture includes showing a second application at the one electronic device; and selecting an object from the second application by the pick-up gesture applied by Ultrasound.

According to the method above, the step of identifying the drag gesture includes showing a drag-gesture user interface at the one electronic device; and showing the shortcut of the first application on a pop-up user interface.

According to the method above, the step of identifying the drop gesture includes sending the object to the first application by touching the shortcut of the first application via the drop gesture.

The present invention also provides an electronic device which is able to perform 3D gesture interaction across itself and a plurality of nearby electronic devices. The electronic device includes a positioning processor and a gesture-interaction processor. The positioning processor is configured to measure location information of the electronic device and receive spatial location information of the nearby electronic devices based on Location Technology, and configured to set the location update method, the detection method of 3D gesture, the frequency band of detecting 3D gesture, and the time sequence of detecting gesture at different devices. The gesture-interaction processor is configured to generate a 3D gesture field of the electronic device based on the spatial location information of the electronic device, detect or receive the cooperative gesture, generate interactive auxiliary messages based on the detection of the cooperative gesture, Updating the 3D gesture field of the electronic devices if the location of any devices have update, identify the cooperative gesture in the 3D gesture field of the electronic device, perform the commands corresponding to the cooperative gesture, detect that the cooperative gesture is beyond the 3D gesture field of the electronic device, and send the cooperative gesture to other electronic devices based on the direction of the cooperative gesture.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Certain words are used to refer to specific elements in the specification and the claims. Those with ordinary knowledge in the technical field should understand that hardware manufacturers may use different terms to refer to the same component. The specification and the claims of the present invention do not use differences in names as a way to distinguish elements, but use differences in functions of elements as a criterion for distinguishing. The "comprise" and "include" mentioned in the entire specification and the claims are open-ended terms, so they should be interpreted as "including but not limited to". "Generally" means that within an acceptable error range, a person with ordinary knowledge in the technical field can solve the technical problem within a certain error range, and basically achieve the technical effect. In addition, the term "coupled" herein includes any direct and indirect electrical connection means. Therefore, if it is described in the text that a first device is coupled to a second device, it means that the first device can be directly electrically connected to the second device, or indirectly electrically connected to the second device through other devices or connecting means.

The following description is the best embodiment expected of the present invention. These descriptions are used to illustrate the general principles of the present invention and should not be used to limit the present invention. The protection scope of the present invention should be determined on the basis of referring to the scope of the claims of the present invention.

Figure 1:
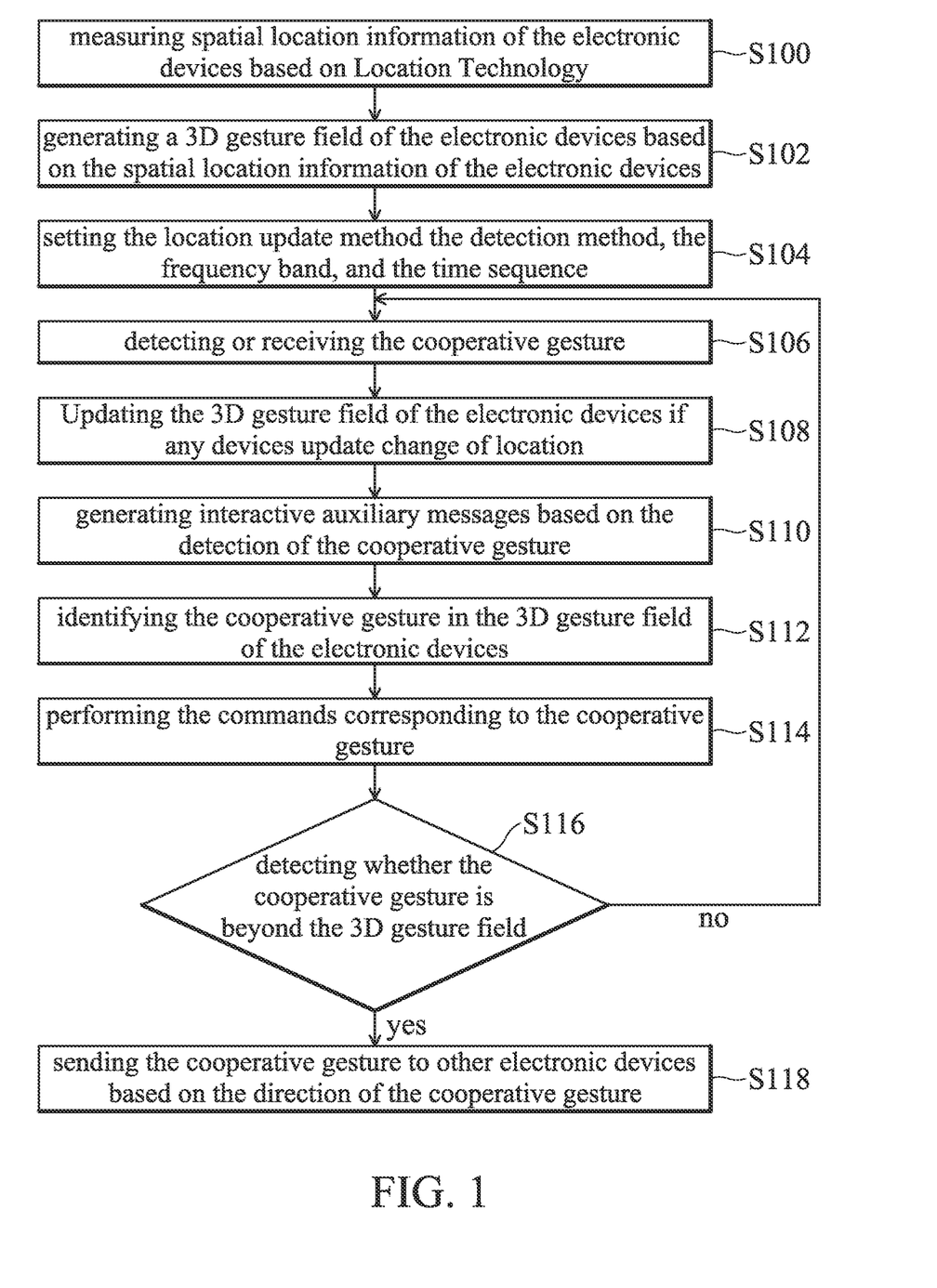
FIG. 1 is a flow chart of a method for 3D gesture interaction across a plurality of electronic devices in accordance with some embodiments of the present invention.

FIG. 1 is a flow chart of a method for 3D gesture interaction across a plurality of electronic devices in accordance with some embodiments of the present invention. As shown in FIG. 1, the method of the present invention includes measuring spatial location information of the electronic devices based on a Location technology (step S100); generating a 3D gesture field of the electronic devices based on the spatial location information of the electronic devices (step S102); setting the location update method, the detection method of 3D gesture, the frequency band of detecting 3D gesture, and the time sequence of detecting gesture at different devices (step S104); detecting or receiving the cooperative gesture (step S106); updating the 3D gesture field of the electronic devices if the location of any devices have update (step S108); generating interactive auxiliary messages based on the detection of the cooperative gesture (step S110); identifying the cooperative gesture in the 3D gesture field (step S112); performing the commands corresponding to the cooperative gesture (step S114); detecting whether the cooperative gesture is beyond the 3D gesture field (step S116); and sending the cooperative gesture to other electronic devices based on the direction of the cooperative gesture (step S118) if the cooperative gesture is beyond the 3D gesture field. In some embodiments, if the cooperative gesture is not beyond the 3D gesture field, then the method of the present invention is back to step S106.

In some embodiment, the location update method in step S104 includes periodically measuring spatial location information for moving devices; measuring spatial location information after receiving "need-to-update-location" event from the moving devices; and receiving spatial location information from the moving devices.

Figure 2A:
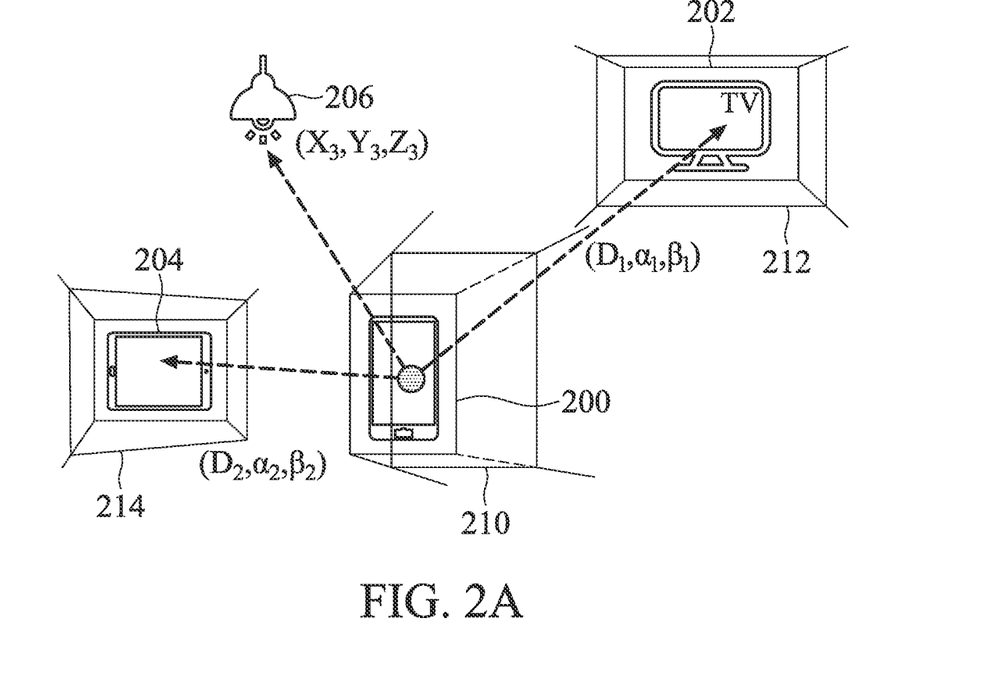
FIG. 2A is a schematic diagram of 3D gesture fields and spatial location information of a plurality of electronic devices in accordance with some embodiments of the present invention.

FIG. 2A is a schematic diagram of 3D gesture fields and spatial location information of a plurality of electronic devices in accordance with some embodiments of the present invention. FIG. 2A shows the spatial location information in step S100, and the 3D gesture fields of the electronic devices in step S102. As shown in FIG. 2A, there are an electronic device 200 (for example, a smart phone), an electronic device 202 (for example, a smart television), an electronic device 204 (for example, a tablet), and an electronic device 206 (for example, a light) in an indoor space. In some embodiments, the electronic devices 200, 202, 204 and 206 all support Ultra-wideband (UWB), so that the electronic device 200 can measure spatial location information of electronic devices 202, 204, and 206 via Location technology, such as UWB. Assuming that the position of the electronic device 200 is a zero point of indoor coordinates, the indoor coordinates of the electronic device 202 is ($D_1$, $\alpha_1$, $\beta_1$) in polar coordinate system, the indoor coordinates of the electronic device 204 is ($D_2$, $\alpha_2$, $\beta_2$) in polar coordinate system, and the indoor coordinates of the electronic device 206 is ($x_3$, $y_3$, $z_3$) in Cartesian coordinate system.

In some embodiments, the electronic devices 200, 202 and 204 also support ultrasound gesture, so that a 3D gesture field 210 is generated in front of the electronic device 200, a 3D gesture field 212 is generated in front of the electronic device 202, and a 3D gesture field 214 is generated in front of the electronic device 204. The electronic device 200 can perform 3D gesture interaction with the electronic devices 202, 204 and 206. For example, operations of the electronic devices 202, 204 and 206 can be controlled by the electronic device 200 in the 3D gesture field.

Figure 2B:
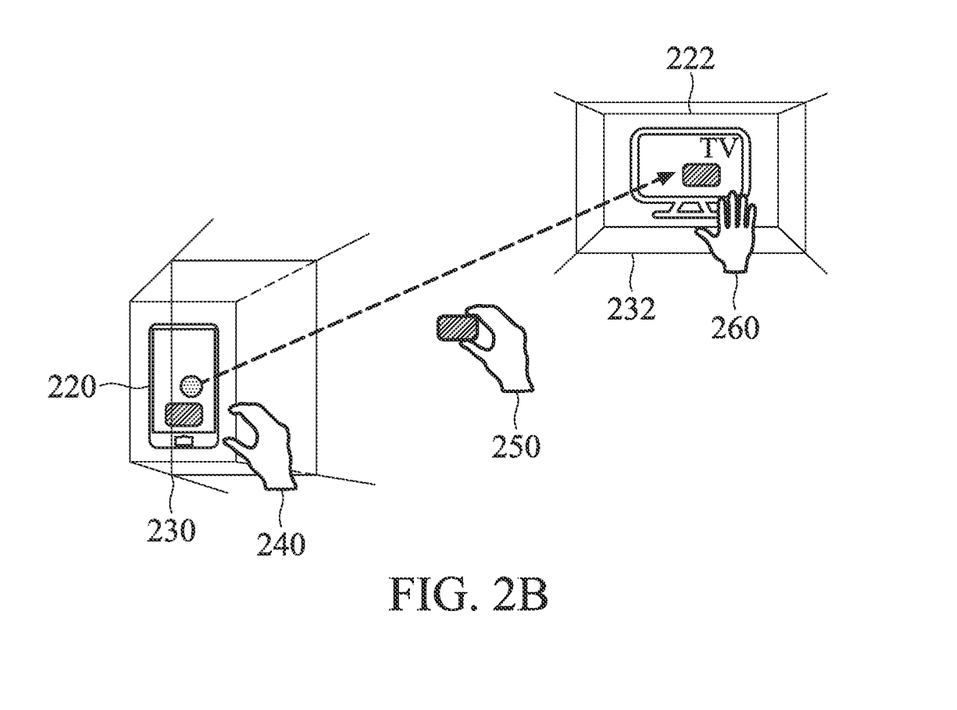
FIG. 2B is a schematic diagram of different gestures in accordance with some embodiments of the present invention.

FIG. 2B is a schematic diagram of different gestures in accordance with some embodiments of the present invention. FIG. 2B shows the cooperative gestures in steps S106 and S110. As shown in FIG. 2B, there are an electronic device 220 and an electronic device 222 in an indoor space. Since both the electronic devices 220 and 222 support ultrasound gesture, a 3D gesture field 230 is generated in front of the electronic device 220, and a 3D gesture field 232 is generated in front of the electronic device 222. In some embodiments, the electronic device 220 can measure the spatial location information of the electronic device 222 based on UWB, so that the direction from the electronic device 220 to the electronic device 222 can be known. At first, the electronic device 220 detects a pick-up gesture 240 from a user in the 3D gesture field of itself. The pick-up gesture 240 is able to pick up an object showing at the electronic device 220. When the electronic device 220 detects that the pick-up gesture 240 becomes a drag gesture 250, and the drag gesture 250 is moved beyond the 3D gesture field 230, the electronic device 220 sends the drag gesture 250 and the object which is selected to the electronic device 222 via communication protocol, such as Bluetooth, Wi-Fi, etc.

After that, when the electronic device 222 detects the drag gesture 250 in the 3D gesture field 232, the drag gesture 250 and the selected object are shown in the electronic device 222. When the electronic device 222 detects that the drag gesture 250 becomes a drop gesture 260, the object selected by the pick-up gesture 240 is shown at the electronic device 222. Therefore, the 3D gesture interaction between the electronic devices 220 and 222 has been completed.

Figure 3:
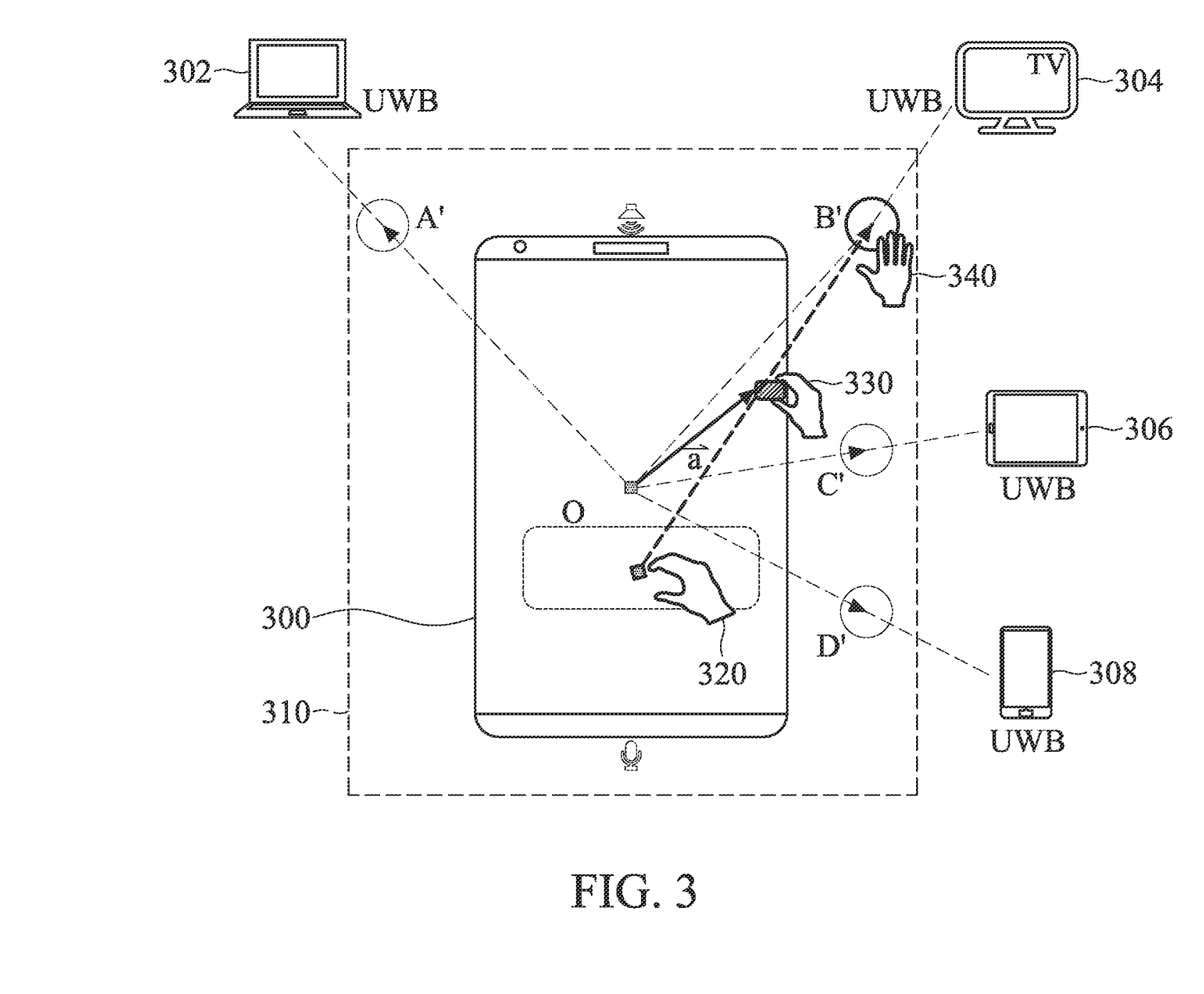
FIG. 3 is a schematic diagram of a scenario 1 for 3D gesture interaction across a plurality of electronic devices in accordance with some embodiments of the present invention.

FIG. 3 is a schematic diagram of a scenario 1 for 3D gesture interaction across a plurality of electronic devices in accordance with some embodiments of the present invention. In the scenario 1, there are an electronic device 300 (for example, a smart phone), an electronic device 302 (for example, a laptop), an electronic device 304 (for example, a smart television), an electronic device 306 (for example, a tablet), and an electronic device 308 (for example, a smart phone). In some embodiments, the electronic devices 300, 302, 304, 306 and 308 all support UWB, but only the electronic device 300 support ultrasound gestures. Therefore, the electronic device 300 is able to measure spatial location information of the electronic devices 302, 304, 306 and 308 based on Location Technology, such as UWB, and further to generate a 3D gesture field 310 based on the spatial location information of the electronic device 300 and its nearby electronic devices 302, 304, 306 and 308.

In some embodiment, the electronic device 300 may set the detection method, the frequency band, and the time sequence of a cooperative gesture, such as a pick-up gesture 320, a drag gesture 330, and a drop gesture 340. The electronic device 300 maps the electronic devices 302, 304, 306 and 308 to the side of the 3D gesture field 310 of the electronic device 300. The electronic device 300 calculates the direction (for example, the vectors $\overline{OA'}$, $\overline{OB'}$, $\overline{OC'}$, and $\overline{OD'}$) from the center of electronic device 300 to the electronic devices 302, 304, 306 and 308. That is, the vector $\overline{OA'}$ is obtained by mapping the electronic device 302 to the side of the 3D gesture field 310 of the electronic device 300. The vector $\overline{OB'}$ is obtained by mapping the electronic device 304 to the side of the 3D gesture field 310 of the electronic device 300. The vector $\overline{OC'}$ is obtained by mapping the electronic device 306 to the side of the 3D gesture field 310 of the electronic device 300. The vector $\overline{OD'}$ is obtained by mapping the electronic device 308 to the side of the 3D gesture field 310 of the electronic device 300. The point O in FIG. 3 represents the location of the center of electronic device 300.

After that, the electronic device 300 identifies the cooperative gesture in the 3D gesture field 310. For example, the electronic device 300 identifies the pick-up gesture 320, the drag gesture 330, and the drop gesture 340 in the 3D gesture field 310. In detail, the electronic device 300 selects an object that a user wants to share by the pick-up gesture 320 via Ultrasound in the 3D gesture field 310. Then, the electronic device 300 generates interactive auxiliary messages based on the detection of the cooperative gesture. For example, the electronic device 300 shows up pop-up user interfaces of the electronic devices (such as the electronic device 302, 304, 306 or 308) according to the direction from the electronic device 300 to the electronic device 302, 304, 306 or 308. The electronic device 300 gets a target electronic device, for example, the electronic device 304 in FIG. 3, among the other electronic devices via the direction of the drag gesture 330, such as a vector $\vec{a}$ in FIG. 3. In some embodiments, the target electronic device (the electronic device 304 in FIG. 3) is gotten when an angle β approaches zero. The angle β is the angle between the vector $\overrightarrow{OB'}$ and the vector $\vec{a}$. In detail, the vector $\vec{a}$ is the direction from the center O of the electronic device 300 to the current location of the drag gesture in the 3D gesture field 310.

Finally, the electronic device 300 sends the object which is selected by the pick-up gesture 320 in the 3D gesture field 310 of the electronic device 300 to the electronic device 304 via the direction of the drag gesture 330 (for example, the vector $\vec{a}$) and the location of the drop gesture 340. In some embodiments, when the drop gesture 340 or the drag gesture 330 is beyond the 3D gesture field 310, the electronic device 300 sends the drop gesture 340 or the drag gesture 330 to the electronic device 304. In the scenario 1, the method of the present invention maps nearby devices (for example, the electronic device 302, 304, 306 and 308) to the side of the 3D gesture field of the electronic device 300 based on the directions of nearby devices. The user can interact across multi-devices via the 3D gesture field of the electronic device 300 which connects other devices. For example, the user can quickly share the object selected by the pick-up gesture 320 to nearby devices via the direction of the drag gesture 330.

Figure 4:
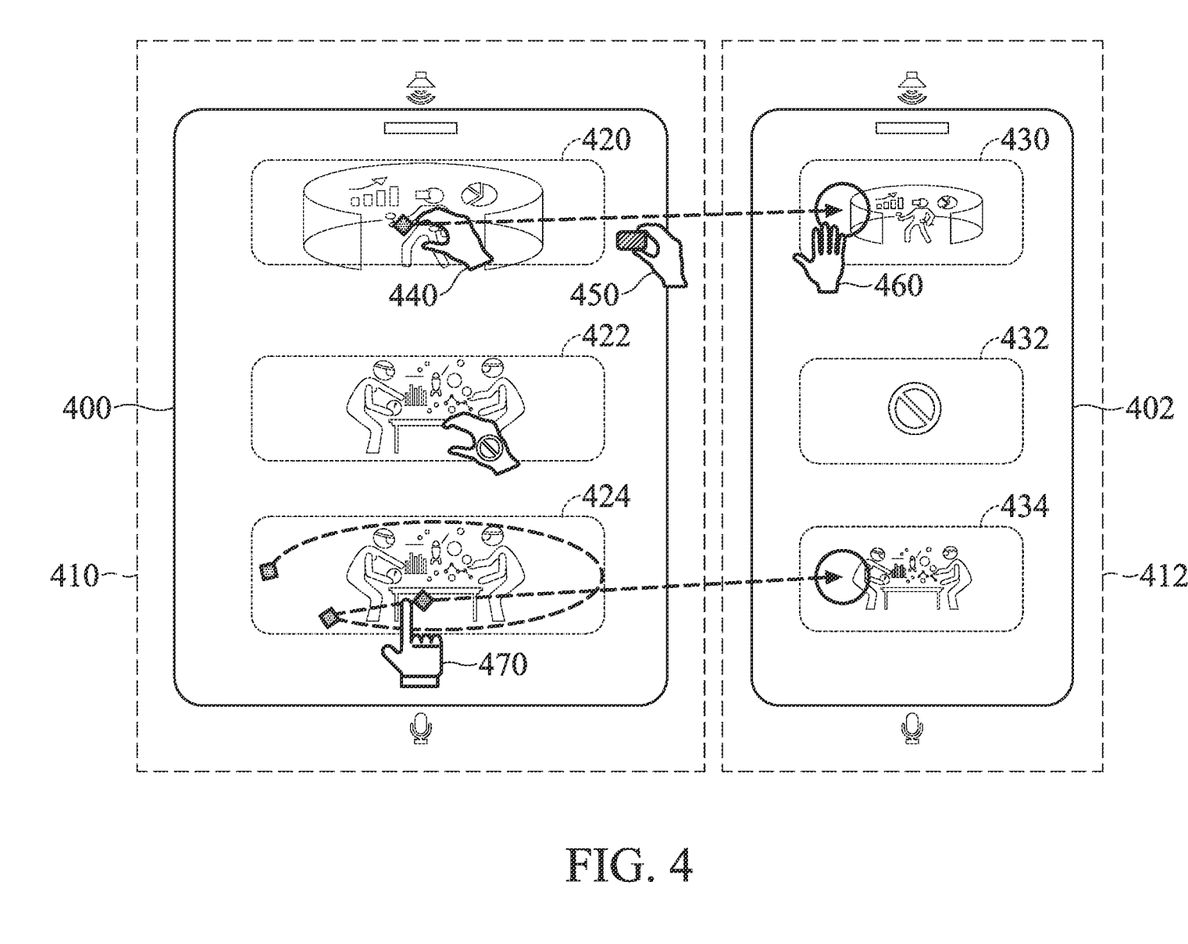
FIG. 4 is a schematic diagram of a scenario 2 for 3D gesture interaction across a plurality of electronic devices in accordance with some embodiments of the present invention.

FIG. 4 is a schematic diagram of a scenario 2 for 3D gesture interaction across a plurality of electronic devices in accordance with some embodiments of the present invention. In the scenario 2, there are an electronic device 400 and an electronic device 402. In some embodiments, the electronic devices 400 and 402 both support UWB and ultrasound gestures. That is, the electronic device 400 can generate a 3D gesture field 410, and the electronic device 402 can generate a 3D gesture field 412. The electronic device 402 is nearby the electronic device 400. However, the 3D gesture field 410 of the electronic device 400 is not overlapped with the 3D gesture field 412 of the electronic device 402. In some embodiments, there are objects 420, 422 and 424 showing at the electronic device 400. The method of the present invention (or the electronic device 400) combines the 3D gesture field 410 of the electronic device 400 and the 3D gesture field 412 of the electronic device 402 nearby the electronic device 400 via the location of the electronic device 400 and the electronic device 402 nearby the electronic device 400 and the direction from the electronic device 400 to the electronic device 402. After that, the electronic device 400 selects the object 420 by a pick-up gesture 440. The electronic device 400 then detects a drag gesture 450, and sends the drag gesture 450 to the electronic device 402 if the drag gesture 450 is beyond the side of the 3D gesture field 410 of the electronic device 400.

After the electronic device 402 receives the drag gesture 450 from the electronic device 400, the electronic device 402 shows a drag-gesture user interface at itself. When the electronic device 402 detects a drop gesture 460, the electronic device 400 sends the object selected by the pick-up gesture 440 to the electronic device 402, so that an object 430, which is the same as the object 420, is shown at the electronic device 402. In some embodiments, the object 422 cannot be picked up due to the object not support Ctrl+C, so that a prohibiting sign is shown on the pick-up gesture, and an object 432 is also shown the prohibiting sign. In some embodiments, the object 424 can be picked up by a circuit gesture 470. The object 424 at the electronic device 400 can then be sent to the electronic device 402 via the drag gesture and the drop gesture to form an object 434. In some embodiments, the user can define action or action list for a specific ultrasound gesture, for example, the circuit gesture 470 to pick up the object 424 by partially copying the contents of the screen via screen copy Tools/SW.

In the scenario 2, the method of the present invention combines gesture fields of the electronic devices 400 and 402 according to their locations and directions. The electronic device 400 sends the drag gesture 450 to the electronic device 402 of the drag gesture 450 is beyond the 3D gesture filed of the electronic device 400. The user can interact across multi-devices placed side by side via combined gesture field. For example, the user can copy and paste contents from the electronic device 400 to the electronic device 402.

Figure 5:
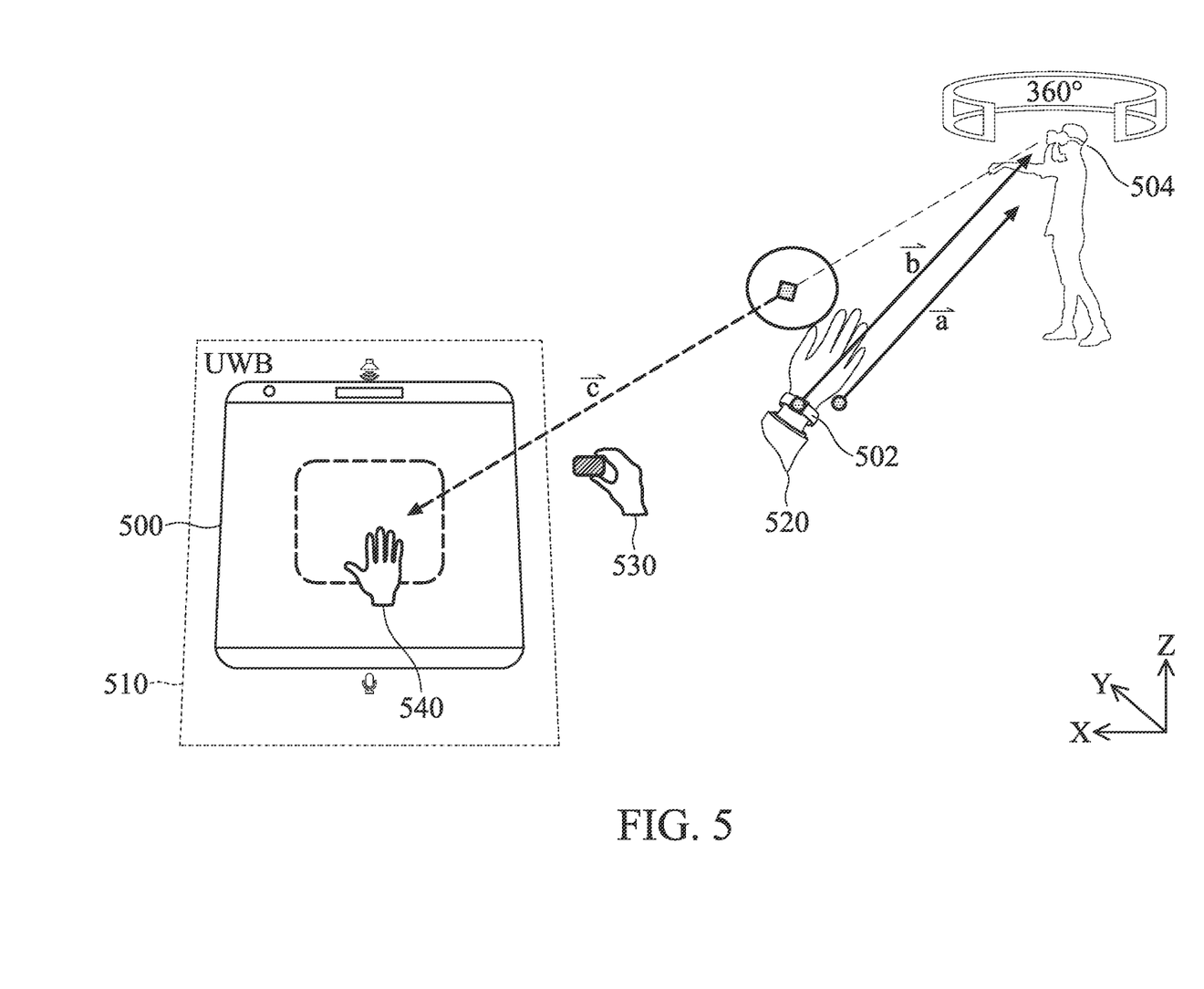
FIG. 5 is a schematic diagram of a scenario 3 for 3D gesture interaction across a plurality of electronic devices in accordance with some embodiments of the present invention.

FIG. 5 is a schematic diagram of a scenario 3 for 3D gesture interaction across a plurality of electronic devices in accordance with some embodiments of the present invention. In the scenario 3, there are an electronic device 500 (for example, a smart phone), an electronic device 502 (for example, a smart watch), and an electronic device 504 (for example, a VR display). In some embodiments, the electronic devices 500, 502 and 504 all support UWB and ultrasound gesture. Therefore, a 3D gesture field 510 is generated in front of the electronic device 500. The electronic device 500 can measure the spatial location information of electronic devices 502 and 504 in indoor coordinates. In some embodiments, the electronic devices 500 and 502 may be operated by the same user, but the present invention is not limited thereto. The method of the present invention combines the 3D gesture field 510 of the electronic device 500 and the 3D gesture field of the moving electronic devices (for example, the electronic devices 502 and 504) according to the real-time locations and the directions of the electronic devices 500, 502 and 504 in indoor coordinates.

Then, the method of the present invention gets the direction of a pick-up gesture 520 of the electronic device 504, gets the ID of the electronic device 504 by comparing the direction of the pick-up gesture 520 (that is, a vector $\vec{a}$) with the direction from the one of the electronic device 502 to the electronic device 504 (that is, a vector $\vec{b}$) After that, the electronic device 504 shows an authorization user interface for waiting for the user that controlling the electronic device 504 to agree to the connection. The method of the present invention sends a drag gesture 530 to the electronic device 500 if the direction from the electronic device 504 to the electronic device 500 interacts with the 3D gesture field 510 of the electronic device 500. That is, a vector $\vec{c}$ interacts with the 3D gesture field 510 of the electronic device 500. The electronic device 500 shows a drag-gesture user interface if the drag gesture 530 enters the 3D gesture field 510 of the electronic device 500. Finally, the user can control the electronic device 504 by controlling the user interface of the electronic device 500 at the electronic device 500. In the scenario 3, the method of the present invention combines the 3D gesture field 510 of the electronic device 500 with devices on motion (for example, the electronic devices 502 and 504) at indoor absolute coordinates. The user can interact across multi-devices via combined gesture. For example, the user can connect another moving device (the electronic device 504) via the direction of gesture by the measurement of the watch (the electronic device 502).

Figure 6:
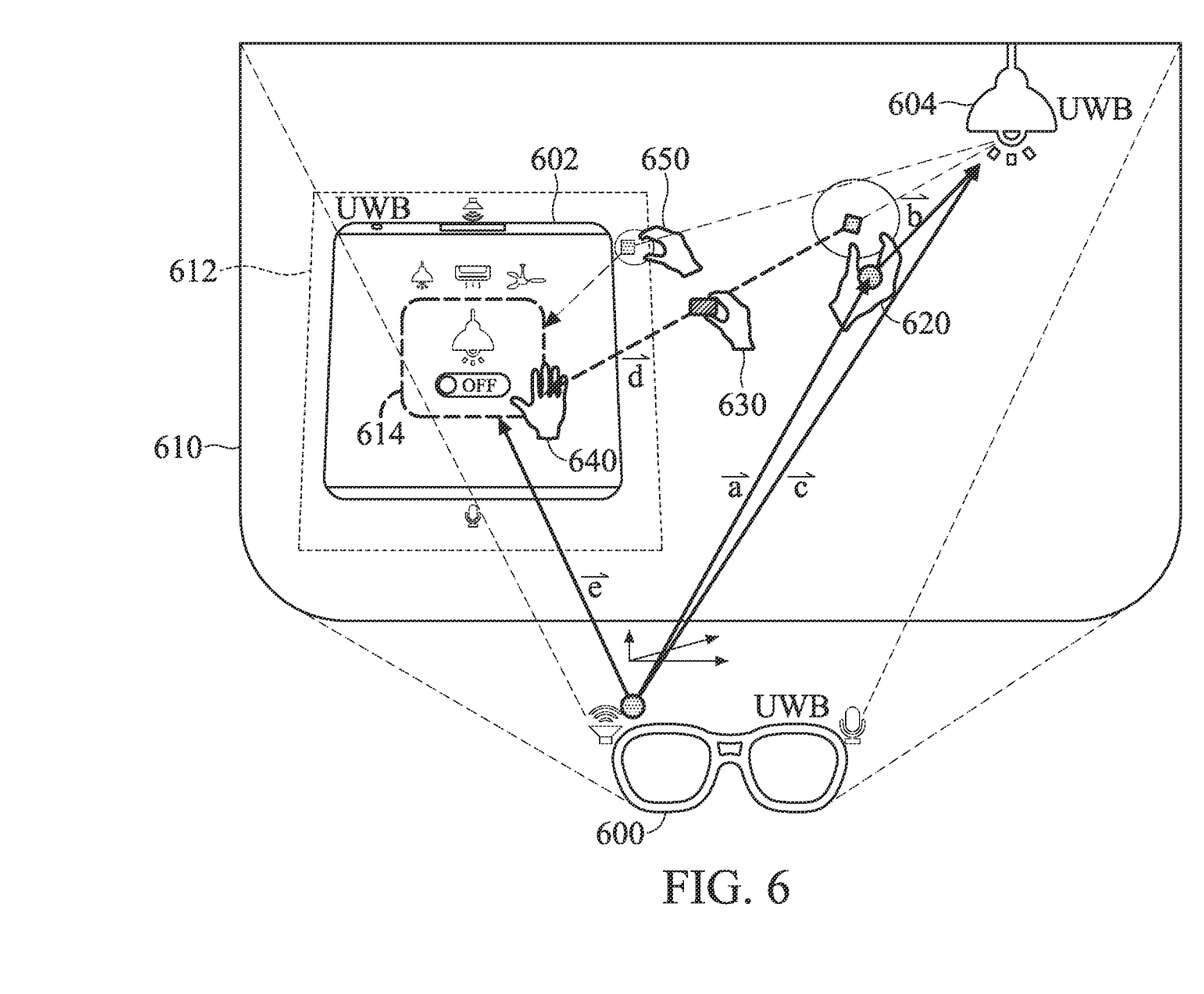
FIG. 6 is a schematic diagram of a scenario 4 for 3D gesture interaction across a plurality of electronic devices in accordance with some embodiments of the present invention.

FIG. 6 is a schematic diagram of a scenario 4 for 3D gesture interaction across a plurality of electronic devices in accordance with some embodiments of the present invention. In the scenario 4, there are an electronic device 600 (for example, a smart glasses), an electronic device 602 (for example, a smart phone), and an electronic device 604 (for example, a light). In some embodiments, the electronic devices 600 and 602 both support UWB and ultrasound gesture, and the electronic device 604 only support UWB. Therefore, the electronic device 600 generates a 3D gesture field 610, and the electronic device 602 generates a 3D gesture field 602. The electronic device 600 can measure spatial location information of the electronic devices 602 and 604. Similarly, the electronic device 602 can also measure spatial location information of the electronic devices 600 and 604. In some embodiments, the method of the present invention combines the 3D gesture field 610 of the electronic device 600 with the 3D gesture field 612 of the electronic device 602 according to the locations and the directions of the electronic devices 600, 602 and 604 in the coordinates of the electronic device 600 when the electronic device 600 is face to face with the electronic devices 602 and 604.

In some embodiments, the method of present invention (or the electronic device 600) first gets the direction from the electronic device 600 to the electronic device 604, that is a vector $\overline{c}$, in the coordinates of the electronic device 600. Then, the electronic device 600 calculates the direction from a hand in a pick-up gesture 620 to the electronic device 604, that is a vector $\overline{b}$, and the direction from the electronic device 600 to the hand in the pick-up gesture 620, that is a vector $\overline{a}$, in the coordinates of the electronic device 600. After that, the electronic device 600 gets the ID of the electronic device 604 by comparing the vector $\overline{a}$, $\overline{b}$, and $\overline{c}$. In some embodiments, the ID of the electronic device 604 is gotten when the result of the vector $\overline{a}$ plus the vector $\overline{b}$ intersect with the vector $\overline{c}$.

After that, the method of present invention (or the electronic device 600) gets the direction of a drag gesture 630 in the coordinates of the electronic device 600, that is a vector $\overline{d}$. Then, the electronic device 600 gets the direction from the electronic device 600 to the electronic device 602 in the coordinates of the electronic device 600, that is a vector $\overline{e}$. The electronic device 600 sends the drag gesture 630 and the ID of the electronic device 604 to the electronic device 602 if the drag gesture 630 enters the 3D gesture field 612 of the electronic device 602. Then, the electronic device 602 shows a drag-gesture user interface if the vector $\overline{d}$ and the vector $\overline{e}$ intersect in the 3D gesture field 612 of the electronic device 602. Finally, the electronic device 602 shows the drag-gesture user interface, so that the user can control the electronic device 604 by the user interface at the electronic device 602. For example, the user can turn on or turn off the electronic device 604 by selecting an object 614 via a pick-up gesture 650.

In the scenario 4, the method of present invention combines gesture field for device on moving with the nearby devices via relative locations and directions. The user can interact across multi-devices placed face to face via dynamic combined gesture field of moving devices. For example, the user can connect and control IoT devices (the electronic device 604) via the direction of gesture by the measurement of the glasses or the phone.

Figure 7:
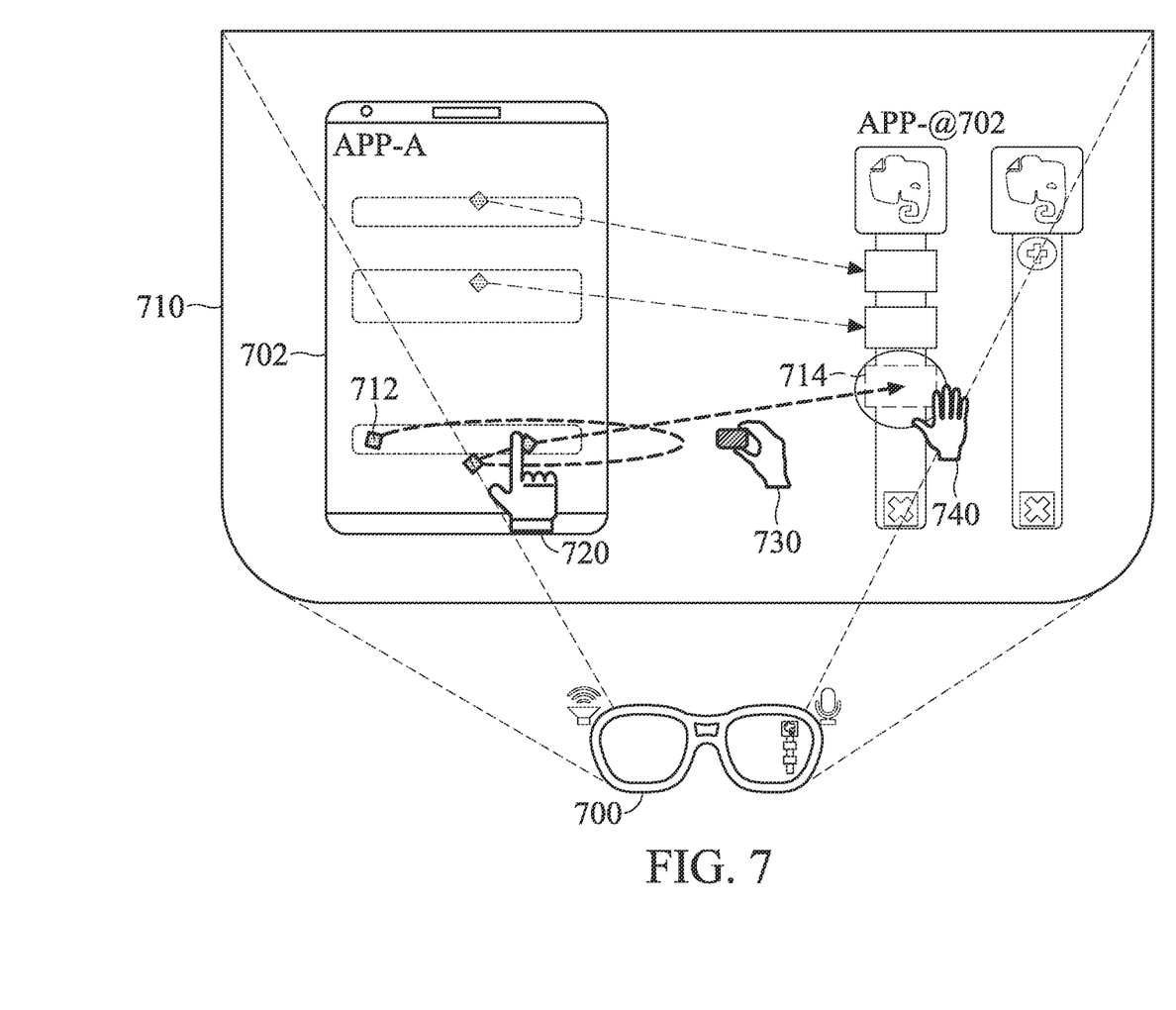
FIG. 7 is a schematic diagram of a scenario 5 for 3D gesture interaction across a plurality of electronic devices in accordance with some embodiments of the present invention.

FIG. 7 is a schematic diagram of a scenario 5 for 3D gesture interaction across a plurality of electronic devices in accordance with some embodiments of the present invention. In the scenario 5, there are an electronic device 700 (for example, smart glasses) and an electronic device 702 (for example, a smart phone). In some embodiments, the electronic devices 700 and 702 both support UWB and ultrasound gesture. Therefore, a 3D gesture field 710 is generated in front of the electronic device 700. An application APP-A and an application APP-B are both executed at the electronic device 702. In some embodiments, the method of present invention first maps applications of the electronic devices 702 to the 3D gesture field 710 of the electronic device 700. In detail, the electronic device 700 maps the shortcut of the application APP-B at the electronic device 702 to the 3D gesture field 710 of the electronic device 700 when the electronic device 702 and the electronic device 700 are face to face. The method of present invention combines the 3D gesture field 710 of the electronic device 700 with that of the electronic device 702 according to the real-time locations and the directions of the electronic devices 700 and 702.

In some embodiments, the application APP-A is shown at the electronic device 702, and the shortcut of the application APP-B is shown at the electronic device 700 (for example, in the 3D gesture field 710). Then, the scope of a pick-up gesture 720 is gotten by the electronic device 700, and the scope of the pick-up gesture 720 is mapped to the electronic device 702. The method of the present invention selects an object 712 from the application APP-A at the electronic device 702 by the scope of the pick-up gesture 720 (or a circle gesture). After that, when the electronic device 700 detects a drag gesture 730, a drag-gesture user interface is shown at both the electronic devices 700 and 702. Finally, the method of the present invention sends the object 712 by touching the shortcut 714 of the application APP-B via a drop gesture 740 based on the electronic device 700.

In the scenario 5, the method of present invention map the shortcut of user equipment's application to the 3D gesture field (for example, the 3D gesture field 710) of the face-to-face devices for extending function of 3D gesture. The user can interact across multi-APPs via gesture field and display of face-to-face devices. For example, the user can quickly make notes by the electronic devices 702 and 700.

Figure 8:
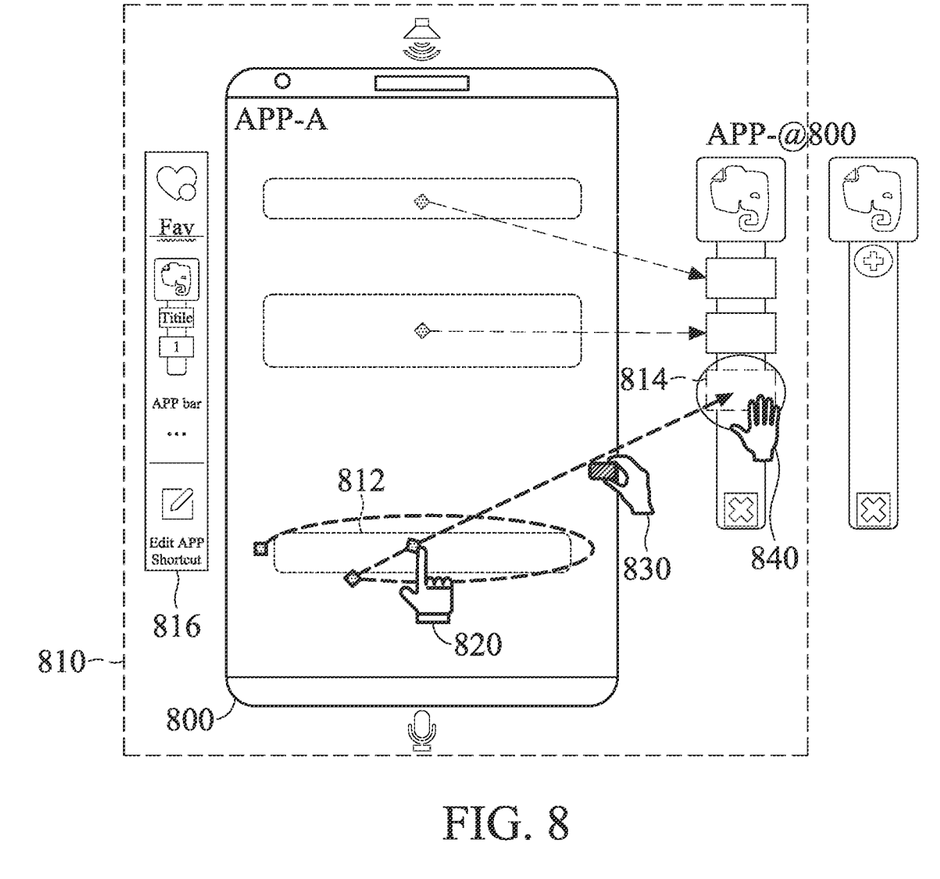
FIG. 8 is a schematic diagram of a scenario 6 for 3D gesture interaction across a plurality of electronic devices in accordance with some embodiments of the present invention.

FIG. 8 is a schematic diagram of a scenario 6 for 3D gesture interaction across a plurality of electronic devices in accordance with some embodiments of the present invention. In the scenario 6, there is an electronic device 800. The electronic device 800 supports UWB and ultrasound gesture. Therefore, a 3D gesture field 810 is generated in front of the electronic device 800. An application APP-A and an application APP-B are both executed at the electronic device 800. In some embodiments, the method of the present invention maps application shortcuts to the side of the electronic device 800 (for example, in the side of the 3D gesture field 810). In detail, the method of the present invention maps the shortcut of the application APP-B to the side of the 3D gesture field 810 of the electronic device 800. In some embodiments, different positions at the side of the 3D gesture field 810 of the electronic device 800 correspond to different shortcuts of the application.

Then, the application APP-A is shown at the electronic device 800. The method of the present invention selects an object 812 from the application APP-A by a pick-up gesture 820 applied by Ultrasound. When the electronic device 800 detects a drag gesture 830, the electronic device 800 shows a drag-gesture user interface. Then, the method of the present invention shows the shortcut of the application APP-B on a pop-up user interface 816. Finally, the electronic device 800 sends the object 812 to the application APP-B by touching the shortcut 814 of the application APP-B via a drop gesture 840.

Figure 9:
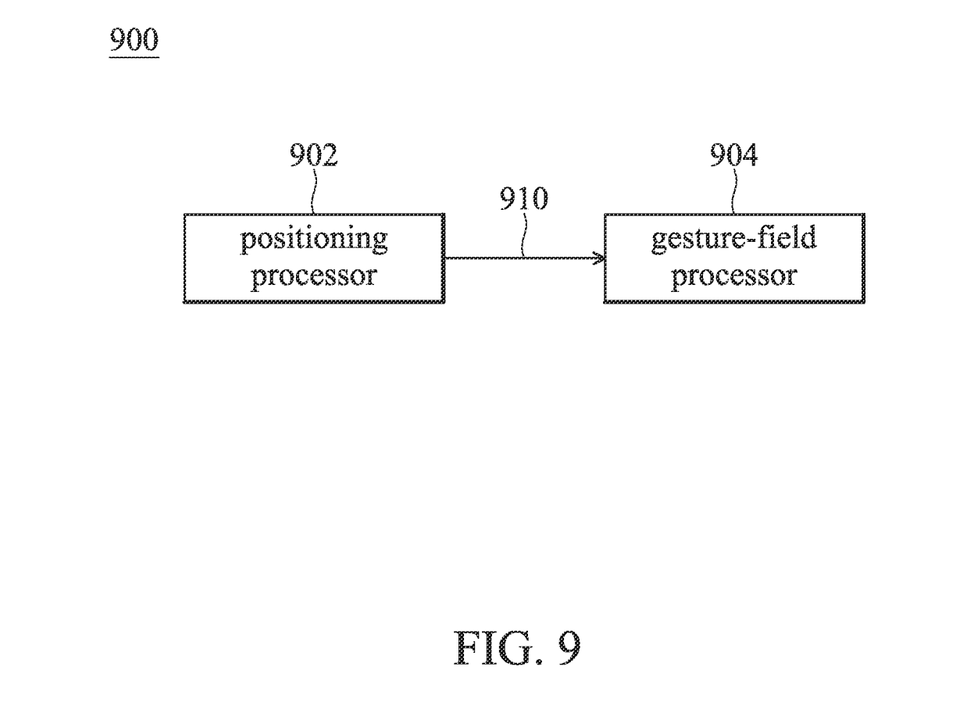
FIG. 9 is a block diagram of an electronic device 900 in accordance with some embodiments of the present invention.

FIG. 9 is a block diagram of an electronic device 900 in accordance with some embodiments of the present invention. As shown in FIG. 9, the electronic device 900 includes a positioning processor 902 and a gesture-field processor 904. In some embodiments, the positioning processor 902 performs positioning based on UWB. For gesture-field processor 904, which can be served as the gesture-field processor 904. The electronic device 900 may be any one of the electronic devices 200, 202 204, 220 and 222 in FIGS. 2A and 2B, the electronic devices 300, 302, 304, 306 and 308 in FIG. 3, the electronic devices 400 and 402 in FIG. 4, the electronic devices 500, 502 and 504 in FIG. 5, the electronic devices 600 and 602 in FIG. 6, the electronic devices 700 and 702 in FIG. 7, the electronic device 800 in FIG. 8. In some embodiments, the positioning processor 902 is configured to obtain location information of an electronic device and receive spatial location information of the nearby electronic devices based on a Location Technology, and configured to set the location update method, the detection method of 3D gesture, the frequency band of detecting 3D gesture, and the time sequence of detecting gesture at different devices. That is, the positioning processor 902 of the electronic device 900 is able to perform steps S100 and S104 in FIG. 1. Furthermore, the positioning processor 902 may send the spatial location information 910 to the gesture-field processor 904 for 3D gesture application.

The gesture-field processor 904 is configured to generate a 3D gesture field of the electronic device based on the spatial location information of the electronic device, detect or receiving the cooperative gesture, generate interactive auxiliary messages based on the detection of the cooperative gesture, update the 3D gesture field of the electronic devices if the location of any devices have update, identify the cooperative gesture in the 3D gesture field, perform the commands corresponding to the cooperative gesture, detect that the cooperative gesture is beyond the 3D gesture field, and send the cooperative gesture to other electronic devices based on the direction of the cooperative gesture. That is, the gesture-field processor 904 is able to perform steps S102, S106, S108, S110, S112, S114, S116 and S118 in FIG. 1.

At present, the power consumption of ultrasound 3D gestures processor is about 20 mA. For mobile devices with limited power such as mobile phones/watches, it is difficult to always turn on the ultrasound 3D gestures processor and wait for user interaction at any time. Therefore, there are three examples that only need to actively turn on the first electronic device for gesture interaction. First, the system may automatically turns on 3D gesture interaction based on user habits and scene recognition, which is applicable to scenarios 5 and 6. Second, when the user wears a watch/band or other device, the system determines whether to open the 3D gesture interaction of accessory device based on the distance/posture, which is applicable to scenarios 1~6. Third, the user turns on the 3D gesture interaction of the device manually, which is applicable to scenarios 1~6.

There are three examples for plug-in devices to keep 3D gesture recognition always on. First, plug-in devices such as TV/speakers keep 3D gestures always on. Second, the always-on device selects the follow-up device based on the gesture direction, and informs the follow-up device to turn on 3D gesture recognition and waits for the user's subsequent gesture interaction. Third, when the always-on device finds that the user is trying to perform 3D gesture interaction with the mobile device, the always-on device notifies the mobile device to open the 3D gesture interaction.

In the several embodiments provided by the present invention, it should be understood that the disclosed system, device, and method can be implemented using other methods. The device embodiments described above are merely illustrative, for example, the division of units is only a logical function division, and there may be other divisions in actual implementation. For example, multiple units or elements can be combined or integrated into another system, or some features may be omitted or not implemented. In addition, the displayed or discussed mutual coupling or direct coupling or communicative connecting may be indirect coupling or communicatively connecting through some interfaces, device or units, and may be in electrical, mechanical, or other forms.

In addition, the functional units in the various embodiments of the present invention may be integrated into one processing unit, or each unit may exist alone physically, or two or more units may be integrated into one unit. The above-mentioned integrated unit can be realized either in the form of hardware or in the form of a software functional unit.

Although the present invention is disclosed above in the preferred embodiment, it is not intended to limit the scope of the present invention. Anyone with ordinary knowledge in the relevant technical field can make changes and modifications without departing from the spirit and scope of the present invention. Therefore, the protection scope of the present invention shall be determined by the scope of the claims.

What is claimed is:

1. A method for 3D gesture interaction across a plurality of electronic devices, performed by one of the electronic devices, comprising:
measuring spatial location information of the electronic devices based on Location Technology;
generating a 3D gesture field of the electronic devices based on the spatial location information of the electronic devices;
setting the location update method, the detection method of 3D gesture, the frequency band of detecting 3D gesture, and the time sequence of detecting gesture at different devices, wherein the location update method includes periodically measuring spatial location information for moving devices;
detecting or receiving the cooperative gesture;
generating interactive auxiliary messages based on the detection of the cooperative gesture;
identifying the cooperative gesture in the 3D gesture field of the electronic devices;
performing the commands corresponding to the cooperative gesture;
detecting that the cooperative gesture is beyond the 3D gesture field; and sending the cooperative gesture to other electronic devices based on the direction of the cooperative gesture.

2. The method as claimed in claim 1, wherein the Location Technology is Ultra-wideband (UWB).

3. The method as claimed in claim 1, wherein the step of generating the 3D gesture field of the electronic devices based on the spatial location information of the electronic devices comprises:
mapping the other electronic devices to the side of the 3D gesture field of the one of the electronic devices;
wherein the step of identifying the cooperative gesture in the 3D gesture field comprises:
identifying a pick-up gesture;
identifying a drag gesture; and/or
identifying a drop gesture.

4. The method as claimed in claim 3, wherein the step of mapping the other electronic devices to the side of the 3D gesture field of the one of the electronic devices comprises:
calculating the direction from the one of the electronic devices to the other electronic devices; and
mapping the other electronic devices to the side of the 3D gesture field of the one of the electronic devices based on the direction from the one of the electronic devices to the other electronic devices.

5. The method as claimed in claim 4, wherein the step of identifying the pick-up gesture comprises:
selecting an object that a user wants to share by the pick-up gesture applied by Ultrasound.

6. The method as claimed in claim 5, wherein the step of identifying the drag gesture comprises:
showing up pop-up user interfaces of the other electronic devices according to the direction from the one of the electronic devices to the other electronic devices; and
getting a target electronic device among the other electronic devices via the direction of the drag gesture.

7. The method as claimed in claim 6, wherein the target electronic device is gotten when an angle $\beta$ approaches zero;
wherein the angle $\beta$ is the angle between a vector $\overrightarrow{OB'}$ and a vector $\vec{a}$ ;
wherein the vector $\overrightarrow{OB'}$ is the direction from the center of the one of the electronic devices to the side of the 3D gesture field of the one of the electronic devices, and the side of the 3D gesture field is mapped by the other electronic devices; and
wherein the vector $\vec{a}$ is the direction from the center of the one of the electronic devices to the current location of the drag gesture.

8. The method as claimed in claim 7, wherein the step of identifying the drop gesture comprises:
sending the object which is selected by the pick-up gesture in the 3D gesture field of the one of the electronic devices to the target electronic device via the direction of the drag gesture and the location of the drop gesture.

9. The method as claimed in claim 1, wherein the step of generating the 3D gesture field of the electronic devices based on the spatial location information of the electronic devices comprises:
creating a combined gesture field for the one of the electronic devices and the electronic device nearby the one of the electronic devices via the Location Technology;
wherein the step of identifying the cooperative gesture in the 3D gesture field comprises:
identifying a pick-up gesture;
identifying a drag gesture; and/or
identifying a drop gesture.

10. The method as claimed in claim 9, wherein the step of creating a combined gesture field for the one of the electronic devices and the electronic device nearby the one of the electronic devices comprises:
combining the 3D gesture field of the one of the electronic devices and that of the electronic device nearby the one of the electronic devices via the locations of the one of the electronic devices and the electronic device nearby the one of the electronic devices and the direction from the one of the electronic devices to the electronic device nearby the one of the electronic devices.

11. The method as claimed in claim 10, wherein the step of identifying the pick-up gesture comprises:
selecting an object at the one of the electronic devices by the pick-up gesture.

12. The method as claimed in claim 11, wherein the step of identifying the drag gesture comprises:
sending the drag gesture to the electronic device nearby the one of the electronic devices if the drag gesture is beyond the side of the 3D gesture field of the one of the electronic devices; and
showing a drag-gesture user interface at the electronic device nearby the one of the electronic devices.

13. The method as claimed in claim 12, wherein the step of identifying the drop gesture comprises:
sending the object selected by the pick-up gesture to the electronic device nearby the one of the electronic devices.

14. The method as claimed in claim 1, wherein the step of generating the 3D gesture field of the electronic devices based on the spatial location information of the electronic devices comprises:
creating a dynamic combined gesture field for the one of the electronic devices and multiple moving electronic devices in the electronic devices via the Location Technology;
wherein the step of identifying the cooperative gesture in the 3D gesture field comprises:
identifying a pick-up gesture;
identifying a drag gesture; and/or
identifying a drop gesture.

15. The method as claimed in claim 14, wherein the step of creating the dynamic combined gesture field for the one of the electronic devices and the multiple moving electronic devices in the electronic devices via the Location Technology, comprises:
combining the 3D gesture field of the one of the electronic devices and those of the moving electronic devices according to the real-time locations and the directions of the one of the electronic devices and the moving electronic devices in indoor coordinates.

16. The method as claimed in claim 15, wherein the step of identifying the pick-up gesture comprises:
getting the direction of the pick-up gesture of one of the moving electronic devices;
getting the ID of the other one of the moving electronic devices by comparing the direction of the pick-up gesture with the direction from the one of the moving electronic devices to the other one of the moving electronic devices; and
showing an authorization user interface at the other one of the moving electronic devices, and waiting for the other one of the moving electronic devices to agree to the connection.

17. The method as claimed in claim 16, wherein the step of identifying the drag gesture comprises:
sending the drag gesture to the one of the electronic devices if the direction from the other one of the moving electronic devices to the one of the electronic devices interacts with the 3D gesture field of the one of the electronic devices; and
showing a drag-gesture user interface at the one of the electronic devices if the drag gesture enters the 3D gesture field of the one of the electronic devices.

18. The method as claimed in claim 17, wherein the step of identifying the drop gesture comprises:
showing and controlling the user interface of the other one moving electronic devices at the one of the electronic devices.

19. The method as claimed in claim 1, wherein the step of generating the 3D gesture field of the electronic devices based on the spatial location information of the electronic devices comprises:
creating a combined gesture field for the one of the electronic devices, the other one of the electronic devices, and a moving electronic device in the electronic devices via the Location Technology;
wherein the step of identifying the cooperative gesture in the 3D gesture field comprises:
identifying a pick-up gesture;
identifying a drag gesture; and/or
identifying a drop gesture.

20. The method as claimed in claim 19, wherein the step of creating the combined gesture field for the one of the electronic devices, the other one of the electronic devices, and the moving electronic device in the electronic devices via the Location Technology, comprises:
combining the 3D gesture field of the moving electronic device with those of the one and the other one of the electronic devices according to the locations and the directions of the moving electronic device and the one and the other one of the electronic devices in coordinates of the moving electronic device when the moving electronic device and the one and the other one of the electronic devices are face to face.

21. The method as claimed in claim 20, wherein the step of identifying the pick-up gesture comprises:
getting the direction from the moving electronic device to the other one of the electronic devices in the coordinates of the moving electronic device;
calculating the direction from a hand in the pick-up gesture to the other one of the electronic devices and the direction from the moving electronic device to the hand in the pick-up gesture in the coordinates of the moving electronic device; and
getting the ID of the other one of the electronic devices by comparing the direction from the moving electronic device to the other one of the electronic devices, the direction from the hand in the pick-up gesture to the other one of the electronic devices, and the direction from the moving electronic device to the hand in the pick-up gesture.

22. The method as claimed in claim 21, wherein the ID of the other one of the electronic devices is gotten when the result of a vector $\bar{a}$ plus a vector $\bar{b}$ intersect with the vector $\bar{c}$ ;
wherein the vector $\bar{a}$ is the direction from the moving electronic device to the hand in the pick-up gesture; the vector $\bar{b}$ is the direction from the hand in the pick-up gesture to the other one of the electronic devices; and the vector $\bar{c}$ is the direction from the moving electronic device to the other one of the electronic devices.

23. The method as claimed in claim 22, wherein the step of identifying the drag gesture comprises:
getting the direction of the drag gesture in the coordinates of the moving electronic device;
getting the direction from the moving electronic device to the one of the electronic devices in the coordinates of the moving electronic device;
sending the drag gesture and the ID of the other one of the electronic devices to the one of the electronic devices if the drag gesture enters the 3D gesture field of the one of the electronic devices; and
showing a drag-gesture user interface at the one of the electronic devices if the direction of the drag gesture and the direction from the moving electronic device to the one of the electronic devices intersect in the 3D gesture field of the one of the electronic devices.

24. The method as claimed in claim 23, wherein the step of identifying the drop gesture comprises:
showing and controlling the user interface of the other one of the electronic devices at the one of the electronic devices.

25. The method as claimed in claim 1, wherein the step of generating the 3D gesture field of the electronic devices based on the spatial location information of the electronic devices comprises:
mapping applications of the one of the electronic devices to the 3D gesture field of a moving electronic device;
wherein the step of identifying the cooperative gesture in the 3D gesture field comprises:
identifying a pick-up gesture;
identifying a drag gesture; and/or
identifying a drop gesture.

26. The method as claimed in claim 25, wherein the step of mapping applications of the one of the electronic devices to the 3D gesture field of a moving electronic device comprises:
mapping the shortcut of a first application at the one of the electronic devices to the 3D gesture field of the moving electronic device when the one of the electronic devices and the moving electronic device are face to face; and
combining the 3D gesture field of the moving electronic device with that of the one of the electronic devices according to the real-time locations and the directions of the one of the electronic devices and the moving electronic device.

27. The method as claimed in claim 26, wherein the step of identifying the pick-up gesture comprises:
showing a second application at the one of the electronic devices, and showing the shortcut of the first application at the moving electronic device;
determining the scope of the pick-up gesture by the moving electronic device, and mapping the scope to the one of the electronic device; and
selecting an object from the second application at the one of the electronic devices by the scope of the pick-up gesture.

28. The method as claimed in claim 27, wherein the step of identifying the drag gesture comprises:
showing a drag-gesture user interface at the one of the electronic devices and the moving electronic device.

29. The method as claimed in claim 28, wherein the step of identifying the drop gesture comprises:
sending the object by touching the shortcut of the first application via the drop gesture based on the moving electronic device.

30. The method as claimed in claim 1, wherein the step of generating the 3D gesture field of the electronic devices based on the spatial location information of the electronic devices comprises:

mapping application shortcuts to the side of the one of the electronic devices;

wherein the step of identifying the cooperative gesture in the 3D gesture field comprises:

identifying a pick-up gesture;

identifying a drag gesture; and/or identifying a drop gesture.

31. The method as claimed in claim 30, wherein the step of mapping the application shortcuts to the side of the one of the electronic devices comprises:

mapping the shortcut of a first application to the side of the 3D gesture field of the one of the electronic devices;

wherein different positions at the side of the 3D gesture field of the one of the electronic devices correspond to different shortcuts of the first application.

32. The method as claimed in claim 31, wherein the step of identifying the pick-up gesture comprises:

showing a second application at the one of the electronic devices; and selecting an object from the second application by the pick-up gesture applied by Ultrasound.

33. The method as claimed in claim 32, wherein the step of identifying the drag gesture comprises:

showing a drag-gesture user interface at the one of the electronic devices; and showing the shortcut of the first application on a pop-up user interface.

34. The method as claimed in claim 33, wherein the step of identifying the drop gesture comprises:

sending the object to the first application by touching the shortcut of the first application via the drop gesture.

35. An electronic device, able to perform 3D gesture interaction across itself and a plurality of nearby electronic devices, comprising:

a positioning processor, configured to measure location information of the electronic device and measure spatial location information of the nearby electronic devices based on Location Technology, and configured to set the location update method, the detection method of 3D gesture, the frequency band of detecting 3D gesture, and the time sequence of detecting gesture at different devices, wherein the location update method includes periodically measuring spatial location information for moving devices; and a gesture-interaction processor, configured to generate a 3D gesture field of the electronic device based on the spatial location information of the electronic device, detect or receive the cooperative gesture, generate interactive auxiliary messages based on the detection of the cooperative gesture, identify the cooperative gesture in the 3D gesture field of the electronic device, perform the commands corresponding to the cooperative gesture, detect that the cooperative gesture is beyond the 3D gesture field, and send the cooperative gesture to other electronic devices based on the direction of the cooperative gesture.

\* \* \* \* \*